United States Patent
Oh et al.

(10) Patent No.: US 10,590,522 B2
(45) Date of Patent: Mar. 17, 2020

(54) ALUMINUM-IRON ALLOY-COATED STEEL SHEET FOR HOT PRESS FORMING, HAVING EXCELLENT HYDROGEN DELAYED FRACTURE RESISTANCE, PEELING RESISTANCE, AND WELDABILITY AND HOT-FORMED MEMBER USING SAME

(71) Applicant: POSCO, Pohang-si (KR)

(72) Inventors: Jin-Keun Oh, Gwangyang-si (KR);
Yeol-Rae Cho, Gwangyang-si (KR);
Il-Ryoung Sohn, Gwangyang-si (KR);
Yong-Soo Kim, Pohang-si (KR)

(73) Assignee: POSCO, Pohang-si (KR)

( * ) Notice: Subject to any disclaimer, the term of this patent is extended or adjusted under 35 U.S.C. 154(b) by 131 days.

(21) Appl. No.: 16/065,330

(22) PCT Filed: Dec. 23, 2016

(86) PCT No.: PCT/KR2016/015155
§ 371 (c)(1),
(2) Date: Jun. 22, 2018

(87) PCT Pub. No.: WO2017/111525
PCT Pub. Date: Jun. 29, 2017

(65) Prior Publication Data
US 2019/0003029 A1    Jan. 3, 2019

(30) Foreign Application Priority Data

Dec. 23, 2015 (KR) .................. 10-2015-0184975

(51) Int. Cl.
*C23C 2/12* (2006.01)
*C23C 2/28* (2006.01)
(Continued)

(52) U.S. Cl.
CPC .............. *C23C 2/12* (2013.01); *B32B 15/012* (2013.01); *B32B 15/18* (2013.01); *B32B 15/20* (2013.01);
(Continued)

(58) Field of Classification Search
None
See application file for complete search history.

(56) References Cited

U.S. PATENT DOCUMENTS 6,296,805 B1   10/2001   Laurent et al.
8,453,482 B2    6/2013   Maki et al.
(Continued)

FOREIGN PATENT DOCUMENTS

CN    1984732    6/2007
CN  103842543    6/2014
(Continued)

OTHER PUBLICATIONS

European Search Report—European Application No. 16879392.5 dated Oct. 10, 2018, citing KR 101 569 505, 1 380 666, EP 2 695 963, EP 2 312 005 and EP 2 377 965.
(Continued)

*Primary Examiner* — Daniel J. Schleis
(74) *Attorney, Agent, or Firm* — Cantor Colburn LLP

(57) ABSTRACT

An Al—Fe alloy coated steel sheet includes a base steel sheet and an alloy coating layer, wherein the base steel sheet includes, by wt %, C: 0.1%~0.5%, Si: 0.01%~2%, Mn: 0.01%~10%, P: 0.001%~0.05%, S: 0.0001%~0.02%, Al: 0.001%~1.0%, N: 0.001%~0.02%, and the balance of Fe and other impurities, wherein the alloy coating layer includes: an Al—Fe alloy layer I formed on the base steel sheet and having a Vickers hardness of 200~800 Hv; an Al—Fe alloy layer III formed on the Al—Fe alloy layer I and having a Vickers hardness of 700~1200 Hv; and an
(Continued)

Al—Fe alloy layer II formed in the Al—Fe alloy layer III continuously or discontinuously in a length direction of the steel sheet, and having a Vickers hardness of 400~900 Hv, wherein an average oxygen content at a depth of 0.1 μm from a surface of the oxide layer is 20% or less by weight.

18 Claims, 2 Drawing Sheets

(51) Int. Cl.
| | |
|---|---|
| C23C 2/40 | (2006.01) |
| C22C 38/02 | (2006.01) |
| C22C 38/04 | (2006.01) |
| C22C 38/06 | (2006.01) |
| C21D 9/46 | (2006.01) |
| C22C 38/58 | (2006.01) |
| C22C 38/44 | (2006.01) |
| C22C 38/00 | (2006.01) |
| C23C 2/26 | (2006.01) |
| C23C 28/00 | (2006.01) |
| C23C 2/02 | (2006.01) |
| B32B 15/01 | (2006.01) |
| B32B 15/18 | (2006.01) |
| B32B 15/20 | (2006.01) |
| C22C 21/00 | (2006.01) |
| C22C 38/28 | (2006.01) |
| C22C 38/32 | (2006.01) |
| C21D 1/673 | (2006.01) |
| C21D 1/74 | (2006.01) |

(52) U.S. Cl.
CPC .............. *C21D 9/46* (2013.01); *C22C 21/00* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C22C 38/44* (2013.01); *C22C 38/58* (2013.01); *C23C 2/02* (2013.01); *C23C 2/26* (2013.01); *C23C 2/28* (2013.01); *C23C 2/40* (2013.01); *C23C 28/32* (2013.01); *C23C 28/345* (2013.01); *C23C 28/36* (2013.01); *C23C 28/44* (2013.01); *C21D 1/673* (2013.01); *C21D 1/74* (2013.01); *C21D 2211/008* (2013.01); *Y10T 428/12757* (2015.01)

(56) References Cited

U.S. PATENT DOCUMENTS

| | | | |
|---|---|---|---|
| 2004/0009366 A1* | 1/2004 | Takagi | B32B 15/012 428/653 |
| 2007/0163685 A1 | 7/2007 | Kusumi et al. | |
| 2011/0056594 A1 | 3/2011 | Macherey et al. | |
| 2011/0174418 A1 | 7/2011 | Maki et al. | |
| 2011/0214475 A1 | 9/2011 | Spehner et al. | |
| 2013/0048161 A1 | 2/2013 | Matsuda et al. | |
| 2013/0295402 A1 | 11/2013 | Oh et al. | |
| 2013/0340899 A1 | 12/2013 | Kusumi et al. | |
| 2014/0083574 A1 | 3/2014 | Nam et al. | |
| 2014/0234659 A1 | 8/2014 | Kawata et al. | |
| 2014/0308166 A1 | 10/2014 | Oh et al. | |
| 2016/0312331 A1 | 10/2016 | Cho et al. | |
| 2016/0362763 A1 | 12/2016 | Oh et al. | |
| 2016/0362764 A1 | 12/2016 | Sohn et al. | |
| 2016/0376679 A1* | 12/2016 | Kim | C23C 2/02 428/653 |
| 2017/0260599 A1 | 9/2017 | Puerta Velasquez et al. | |

FOREIGN PATENT DOCUMENTS

| | | |
|---|---|---|
| EP | 1380666 | 1/2004 |
| EP | 2312005 | 4/2011 |
| EP | 2377965 | 10/2011 |
| EP | 2695963 | 2/2014 |
| JP | 2003034844 | 2/2003 |
| JP | 2003034845 | 2/2003 |
| JP | 2003082436 | 3/2003 |
| JP | 2004043887 | 2/2004 |
| JP | 2005097725 | 4/2005 |
| JP | 2006051543 | 2/2006 |
| JP | 2010018860 | 1/2010 |
| JP | 2010043323 | 2/2010 |
| JP | 4590025 | 12/2010 |
| JP | 2011512455 | 4/2011 |
| JP | 2011184758 | 9/2011 |
| JP | 2012180594 | 9/2012 |
| JP | 2015030890 | 2/2015 |
| KR | 20070119096 | 12/2007 |
| KR | 100836282 | 6/2008 |
| KR | 20100108608 | 10/2010 |
| KR | 20110018420 | 2/2011 |
| KR | 101108838 | 1/2012 |
| KR | 20120073407 | 7/2012 |
| KR | 20130050138 | 5/2013 |
| KR | 20150075329 | 7/2015 |
| KR | 20150075435 | 7/2015 |
| KR | 101569505 | 11/2015 |
| KR | 101569508 | 11/2015 |
| KR | 101569509 | 11/2015 |
| KR | 20160078852 | 7/2016 |
| WO | 02103073 | 12/2002 |
| WO | 2014037627 | 3/2014 |
| WO | 2014166630 | 10/2014 |

OTHER PUBLICATIONS

Chinese Office Action—Chinese Application No. 201680076257.2 dated Sep. 9, 2019, citing CN103842543, CN1472068, CN106133179, CN 106164317, CN1984732, CN103429774, CN103492605, CN102089451 and CN102348824.

* cited by examiner

ALUMINUM-IRON ALLOY-COATED STEEL SHEET FOR HOT PRESS FORMING, HAVING EXCELLENT HYDROGEN DELAYED FRACTURE RESISTANCE, PEELING RESISTANCE, AND WELDABILITY AND HOT-FORMED MEMBER USING SAME

TECHNICAL FIELD

The present disclosure relates to an aluminum-iron (Al—Fe) coated steel sheet mainly used for automotive members having crashworthiness such as automotive structural members or reinforcing materials, and a hot formed member manufactured using the Al—Fe coated steel sheet. More particularly, the present disclosure relates to an ultra-high-strength Al—Fe coated steel sheet having a tensile strength of 1000 MPa or greater and a hot-formed member manufactured using the Al—Fe coated steel sheet and having high hydrogen delayed fracture resistance and high spot weldability.

BACKGROUND ART

Recently, hot-formed ultra-high-strength members have been widely used as automotive structural members for purposes such as improving fuel efficiency by weight reduction and passenger protection, and a great deal of research has been conducted for such purposes.

The invention disclosed in U.S. Pat. No. 6,296,805 B1 may be a typical example thereof. According to the patent, an Al—Si coated steel sheet is heated to 850° C. or greater, and a hot press forming process and a cooling process are performed to form a member having a martensite phase and thus, ultra-high strength, within the range of 1600 MPa or greater in tensile strength. However, according to the patent, a coating layer having aluminum (Al) as a main phase is formed, and thus, when a blank is heated in a heating furnace, the Al coating layer may melt at a temperature equal to or greater than the melting point of the Al coating layer. Thus, aluminum (Al) may be fused with rolls provided in the heating furnace. In addition, when the Al—Si coated steel sheet is heated in the heating furnace, hydrogen from steam present in the air may diffuse into steel, and thus hydrogen delayed fracture may occur in a hot-formed member.

The invention disclosed in Korean Patent Application No. 10-2011-7000520 may be a technique for solving this problem. According to the patent, a coil of an Al coated steel sheet is annealed for removing hydrogen introduced during an Al coating process, preventing an Al coating layer from flowing down in a rapid heating process, and thus preventing the occlusion of hydrogen. However, according to the patent, a dew point of −10° C. or higher is required in the coil annealing process to prevent the occlusion of hydrogen, and a batch annealing process is performed in air atmosphere to prevent surface quality deterioration of a steel sheet. Therefore, large amounts of oxides may be formed on the surface of a steel sheet, and the spot weldability of a hot-formed member may deteriorate.

In addition, Korean Patent Application No. 10-2010-7019003 discloses a technique in which a batch annealing process is performed to partially alloy an Al—Fe coating layer and reduce a hot forming process time. However, according to the disclosed technique, when an Al—Fe coated coil is passed through a roll leveller to obtain flatness, a partially alloyed portion may be separated due to stress.

Therefore, it is required to develop an Al—Fe alloy coated steel sheet for hot forming, which is capable of guaranteeing the spot weldability of a hot-formed member by suppressing the formation of surface oxides after an Al—Si coated coil is batch annealed, preventing coating layer separation when an Al—Fe coated coil passes through a roll leveller after the batch annealing process, and suppressing the occlusion of hydrogen to guarantee high hydrogen delayed fracture resistance after a hot forming process in air or another atmosphere.

DISCLOSURE

Technical Problem

To solve the above-described problems, aspects of the present disclosure may include an ultra-high-strength aluminum-iron (Al—Fe) coated steel sheet having a tensile strength of 1000 MPa or greater after a hot forming process, and a hot-formed member manufactured using the coated steel sheet.

In addition, aspects of the present disclosure may include a method of manufacturing the Al—Fe coated steel sheet and a method of manufacturing a hot-formed member using the Al—Fe coated steel sheet.

However, aspects of the present disclosure are not limited thereto. Additional aspects will be set forth in part in the description which follows, and will be apparent from the description to those of ordinary skill in the art to which the present disclosure pertains.

Technical Solution

According to an aspect of the present disclosure, there may be provided an aluminum-iron (Al—Fe) alloy coated steel sheet for hot forming, having high resistance to hydrogen delayed fracture and coating layer separation and high weldability, the Al—Fe alloy coated steel sheet including a base steel sheet and an alloy coating layer formed between the base steel sheet and an oxide layer, wherein the base steel sheet may include, by wt %, carbon (C): 0.1% to 0.5%, silicon (Si): 0.01% to 2%, manganese (Mn): 0.01% to 10%, phosphorus (P): 0.001% to 0.05%, sulfur (S): 0.0001% to 0.02%, aluminum (Al): 0.001% to 1.0%, nitrogen (N): 0.001% to 0.02%, and a balance of iron (Fe) and other impurities, wherein the alloy coating layer may include: an Al—Fe alloy layer I formed on the base steel sheet and having a Vickers hardness of 200 Hv to 800 Hv; an Al—Fe alloy layer III formed on the Al—Fe alloy layer I and having a Vickers hardness of 700 Hv to 1200 Hv; and an Al—Fe alloy layer II formed in the Al—Fe alloy layer III continuously or discontinuously in a length direction of the steel sheet, and having a Vickers hardness of 400 Hv to 900 Hv, wherein an average oxygen content at a depth of 0.1 μm from a surface of the oxide layer may be 20% or less by weight.

The Al—Fe alloy layer I may have an Al content within a range of 5% to 30% by weight, the Al—Fe alloy layer II may have an Al content within a range of 20% to 50% by weight, and the alloy layer III may have an Al content within a range of 40% to 70% by weight.

A cross-sectional area fraction of an Al—Fe intermetallic compound phase having an Al content of 70% or less by weight may be greater than 99% in the alloy coating layer.

The base steel sheet may have a hydrogen content of 0.5 ppmw or less.

The base steel sheet may further include at least one selected from the group consisting of chromium (Cr), molybdenum (Mo), and tungsten (W) in an amount of 0.01% to 4.0%.

The base steel sheet may further include at least one selected from the group consisting of titanium (Ti), niobium (Nb), zirconium (Zr), and vanadium (V) in an amount of 0.001% to 0.4%.

The base steel sheet may further include copper (Cu)+ nickel (Ni) in an amount of 0.005% to 2.0%, antimony (Sb)+tin (Sn) in an amount of 0.001% to 1.0%, or boron (B) in an amount of 0.0001% to 0.01%.

According to another aspect of the present disclosure, there may be provided a hot press formed (HPF) member having high resistance to hydrogen delayed fracture and coating layer separation and high weldability, the HPF member being formed by performing a hot press forming process on the Al—Fe alloy coated steel sheet, the HPF member including martensite as a main phase of a microstructure thereof and having a tensile strength of 1000 MPa or greater.

The product of the tensile strength of the HPF member and the hydrogen content of the base steel sheet may be 1300 or less.

Surface oxides of the HPF member may have an average oxygen weight percent within a range of 40% or less at a depth of 0.1 μm from a surface of the surface oxides.

According to another aspect of the present disclosure, there may be provided a method of manufacturing an Al—Fe alloy coated steel sheet for hot forming, the Al—Fe alloy coated steel sheet having high resistance to hydrogen delayed fracture and coating layer separation and high weldability, the method including:

forming an Al—Si coating layer on a surface of a base steel sheet, the base steel sheet including, by wt %, carbon (C): 0.1% to 0.5%, silicon (Si): 0.01% to 2%, manganese (Mn): 0.01% to 10%, phosphorus (P): 0.001% to 0.05%, sulfur (S): 0.0001% to 0.02%, aluminum (Al): 0.001% to 1.0%, nitrogen (N): 0.001% to 0.02%, and a balance of iron (Fe) and other impurities;

heating the Al—Si coated base steel sheet to a heat treatment maximum temperature ranging from 450° C. to 750° C. at a heating rate of 1° C./hr to 500° C./hr in a heating furnace in which an atmosphere having a dew point of less than −10° C. is present; and forming an Al—Fe alloy coating layer on the surface of the base steel sheet by maintaining the Al—Si coated base steel sheet at the heat treatment maximum temperature for 1 to 100 hours.

Before reaching the heat treatment maximum temperature, the Al—Si coated base steel sheet may be maintained within a temperature within a range of 300° C. to less than a melting point of an Al coating layer for 1 to 100 hours.

The Al—Fe alloy coating layer may include:

an Al—Fe alloy layer I formed on the base steel sheet and having a Vickers hardness of 200 Hv to 800 Hv;

an Al—Fe alloy layer III formed on the Al—Fe alloy layer I and having a Vickers hardness of 700 Hv to 1200 Hv; and an Al—Fe alloy layer II formed in the Al—Fe alloy layer III continuously or discontinuously in a length direction of the steel sheet, and having a Vickers hardness of 400 Hv to 900 Hv, wherein an oxide layer may be formed on an upper portion of the Al—Fe alloy coating layer, and an average oxygen content at a depth of 0.1 μm from a surface of the oxide layer is 20% or less by weight.

The Al—Fe alloy layer I may have an Al content within a range of 5% to 30% by weight, the Al—Fe alloy layer II may have an Al content within a range of 20% to 50% by weight, and the Al—Fe alloy layer III may have an Al content within a range of 40% to 70% by weight.

The base steel sheet may have a hydrogen content of 0.5 ppmw or less.

According to another aspect of the present disclosure, there may be provided a method of manufacturing an HPF member having high resistance to hydrogen delayed fracture and coating layer separation and high weldability, the method including:

preparing the above-described coated steel sheet;

heating the coated steel sheet at a heating rate of 1° C./s to 1000° C./s to a temperature within a range of Ae3+30° C. to Ae3+150° C., and then maintaining the coated steel sheet at the temperature for 1 second to 1000 seconds; and hot forming the heated coated steel sheet and simultaneously cooling the steel sheet at a cooling rate of 1° C./s to 1000° C./s.

Advantageous Effects

As described above, according to the aspects of the present disclosure, a coated steel sheet for manufacturing hot-formed members applicable to automotive members having crashworthiness may be effectively provided, and a hot-formed member manufactured using the coated steel sheet may be effectively provided. That is, the steel sheet may have high coating adhesion, and the formed member manufactured using the steel sheet may have high hydrogen embrittlement resistance and spot weldability and may thus be usefully used as an automotive member having crashworthiness.

BEST MODE

Figure 1:
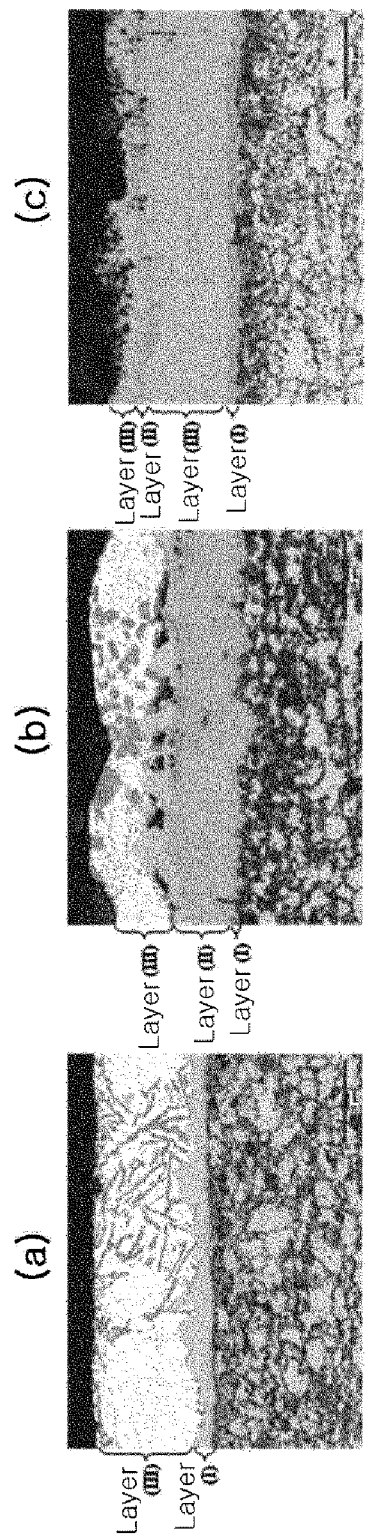
FIG. 1 is optical photographs illustrating Aluminum-iron (Al—Fe) coating layer structures formed on base steel sheets, (a) illustrating a general Al coating layer, (b) illustrating an Al—Fe coating layer which is incompletely alloyed and (c) illustrating an Al—Fe alloy coating layer of the present disclosure.

Embodiments of the present disclosure will now be described in detail.

The inventors have found that in a method of manufacturing an Al—Fe coated coil by performing a batch annealing process on an Al—Si coated coil, if the atmosphere of the batch annealing process and heat-treatment conditions are properly adjusted, the microstructure and characteristics of an Al—Fe coating layer may be varied for preventing the Al—Fe coating layer from being stripped when passing through a roll leveller and also for suppressing hydrogen delayed fracture and guaranteeing spot weldability. Based on this knowledge, the inventors provide the present invention.

First, the composition of a base steel sheet for manufacturing an Al—Fe coated steel sheet and a formed member, and reasons for limiting the composition of the base steel sheet will be described according to the present disclosure. Hereinafter, the content of each element is in wt % unless otherwise specified.

Carbon (C): 0.1% to 0.5%

Carbon (C) is an element for improving the strength of a heat-treated member, and to this end, carbon (C) is added in proper amounts. If the content of carbon (C) is less than 0.1%, it is difficult to obtain sufficient strength, and thus carbon (C) is added in an amount of 0.1% or greater. However, if the content of carbon (C) is greater than 0.5%, the cold rollability of a hot-rolled steel sheet is markedly lowered in a cold rolling process because the strength of the hot-rolled steel sheet is too high, and also spot weldability is markedly lowered. Thus, it may be preferable that the content of carbon (C) be 0.5% or less. More preferably, the content of carbon (C) may be 0.45% or less, and even more preferably 0.4% or less.

Silicon (Si): 0.01% to 2%

Silicon (Si) is added to remove oxygen in a steel making process, suppress the formation of carbides markedly affecting the strength of a hot-formed member, and obtain retained austenite by concentrating carbon (C) along grain boundaries of lath martensite after martensite is formed during a hot forming process. If the content of silicon (Si) is less than 0.01%, these effects may not be obtained. In addition, it is difficult to impart a high degree of cleanliness to steel, and excessive costs may be incurred. However, if the content of silicon (Si) is greater than 2%, aluminum (Al) coatability is markedly lowered. Thus, silicon (Si) is added in an amount of 2% or less, and preferably 1.5% or less.

Mn (Manganese): 0.01% to 10%

Manganese (Mn) is added to guarantee solid solution strengthening and also to lower a critical cooling rate of a hot-formed member for guaranteeing the formation of martensite. If the content of manganese (Mn) is less than 0.01%, there is a limit to obtaining these effects. Conversely, if the content of manganese (Mn) is greater than 10%, the strength of a steel sheet is excessively high before a hot forming process, thereby decreasing workability, increasing product cost due to the necessity of adding excessive alloy iron, and decreasing spot weldability. Therefore, preferably, the content of manganese (Mn) may be adjusted to be 9% or less, and more preferably 8% or less.

Aluminum (Al): 0.001% to 1.0%

Together with silicon (Si), aluminum (Al) functions as a deoxidizer during a steel making process and thus may increase the cleanliness of steel. If the content of aluminum (Al) is less than 0.001%, it may be difficult to obtain such effects, and if the content of aluminum (Al) is greater than 1.0%, the Ac3 transformation temperature increases excessively, and thus, a high heating temperature is required. Thus, the upper limit of the content of aluminum (Al) is set to be 1.0%.

Phosphorus (P): 0.001% to 0.05%

Phosphorus (P) is an impurity. Many manufacturing costs are incurred to adjust the content of phosphorus (P) to be less than 0.001%, and if the content of phosphorus (P) is greater than 0.05%, the weldability of a hot-formed member is markedly decreased. Thus, the upper limit of the content of phosphorus (P) is set to be 0.05%. Preferably, the content of phosphorus (P) may be adjusted to be 0.03% or less.

Sulfur (S): 0.0001% to 0.02%

Sulfur (S) is an impurity included in steel and having a negative effect on the ductility, impact characteristics, and weldability of a member, and thus, the maximum content of sulfur (S) is set to be 0.02% (preferably 0.01 or less). However, if the minimum content of sulfur (S) is set to be less than 0.0001%, material costs markedly increase.

Nitrogen (N): 0.001% to 0.02%

Nitrogen (N) is an impurity included in steel. If the content of nitrogen (N) is less than 0.001%, high manufacturing costs are incurred, and if the content of nitrogen (N) is greater than 0.02%, a slab may become sensitive to cracks during a continuous casting process, and impact characteristics may also deteriorate.

The base steel sheet having the above-described composition may further include: at least one selected from the group consisting of chromium (Cr), molybdenum (Mo), and tungsten (W) in an amount of 0.01% to 4.0%; at least one selected from the group consisting of titanium (Ti), niobium (Nb), zirconium (Zr), and vanadium (V) in an amount of 0.001% to 0.4%; copper (Cu)+nickel (Ni) in an about of 0.005% to 2.0%; antimony (Sb)+tin (Sn) in an amount of 0.001% to 1.0%; and boron (B) in an amount of 0.0001% to 0.01%.

Sum of at least one selected from the group consisting of Cr, Mo, and W: 0.01% to 4.0%

Chromium (Cr), molybdenum (Mo), and tungsten (W) improve hardenability and have precipitation strengthening effect, thereby guaranteeing strength and grain refinement. However, if the total content of at least one selected from chromium (Cr), molybdenum (Mo), and tungsten (W) is less than 0.01%, it is difficult to obtain these effects, and if the total content of at least one selected from chromium (Cr), molybdenum (Mo), and tungsten (W) is greater than 4.0%, these effects are saturated, and a decrease in weldability and an increase in costs are also caused.

Sum of at least one selected from the group consisting of Ti, Nb, Zr, and V: 0.001% to 0.4%

Titanium (Ti), niobium (Nb), and vanadium (V) have an effect of improving a steel sheet as a heat treatment member by forming fine precipitates, as well as an effect of stabilizing retained austenite and improving impact toughness by inducing grain refinement. However, if the total content thereof is equal to or less than 0.001%, it is difficult to obtain such effects. If the total content thereof is greater than 0.4%, these effects are saturated, and it is costly to add alloy iron.

Cu+Ni: 0.005% to 2.0%

Copper (Cu) may be added as an element forming fine precipitates and thus improving strength. In addition, nickel (Ni) is optionally added because hot brittleness may be caused when copper (Cu) is solely added. However, if the total content of Cu+Ni is less than 0.005%, it may be difficult to obtain the above-mentioned effects. If the total content of Cu+Ni is greater than 2.0%, costs increase excessively, and thus, the upper limit of the total content of Cu+Ni is set to be 2.0%.

Sb+Sn: 0.001% to 1.0%,

During an annealing process for Al—Si coating, antimony (Sb) and tin (Sn) may be concentrated in a surface, thereby suppressing the formation of silicon (Si) or manganese (Mn) oxides on the surface and improving coatability. Antimony (Sb) and tin (Sn) are added in an amount of 0.001% or greater to obtain such effects. However, if the total content of Sb+Sn is greater than 1.0%, alloy iron costs may be excessive, and antimony (Sb) and tin (Sn) may be dissolved along grain boundaries of a slab to cause coil edge cracks during a hot rolling process. Thus, the upper limit of the total content of Sb+Sn is set to be 1.0%.

Boron (B): 0.0001% to 0.01%

The addition of even a small amount of boron (B) improves hardenability, and boron (B) segregates along prior-austenite grain boundaries to suppress embrittlement of a hot-formed member caused by phosphorus (P) and/or sulfur (S) precipitating along grain boundaries. However, if the content of boron (B) is less than 0.0001%, it is difficult to obtain these effects. Conversely, if the content of boron (B) is greater than 0.01%, these effects are saturated and incur brittleness at hot rolling. Thus, preferably, the content of boron (B) may be set to be 0.01% or less, and more preferably 0.005% or less.

In addition, the Al—Fe coated steel sheet and the formed member of the present disclosure are characterized in that an Al—Fe alloy layer is formed on the base steel sheet having the above-described composition, and the structure thereof is as follows.

First, an Al—Fe alloy layer I having a Vickers hardness of 200 to 800 is formed on the base steel sheet, and an Al—Fe alloy layer III having a Vickers hardness of 700 to 1200 is formed on the Al—Fe alloy layer I. Then, an Al—Fe alloy layer II having a Vickers hardness of 400 to 900 is formed in the Al—Fe alloy layer III continuously or discontinuously in the length direction of the Al—Fe alloy layer III.

In addition, according to the present disclosure, it may be preferable that the content of aluminum (Al) in the Al—Fe alloy layer I be within the range of 5% to 30% by weight, the content of aluminum (Al) in the Al—Fe alloy layer II be within the range of 20% to 50% by weight, and the content of aluminum (Al) in the Al—Fe alloy layer III be within the range of 40% to 70% by weight.

In addition, according to the present disclosure, it may be preferable that the cross-sectional area fraction of an Al—Fe intermetallic compound phase having an aluminum (Al) content of 70% or less by weight is greater than 99% in the Fe—Al alloy coating layer. If the cross-sectional area fraction is 99% or less, the coating layer may be separated from a coil when the coil passes through a roll leveller, thereby contaminating the roll leveller and having a negative effect on the surface of the coil. More preferably, the cross-sectional area fraction may be 100%, that is, complete alloying.

In addition, according to the present disclosure, the content of hydrogen (H) in the base steel sheet of the Al—Fe coated steel sheet may preferably be 0.5 ppmw or less. Hydrogen (H) is included in the base steel sheet during an Al—Si coating process and a batch annealing process in which atmosphere control is performed. However, since an Al—Fe coating layer formed by the batch annealing process functions as a main obstacle preventing hydrogen (H) from escaping from the base steel sheet, this hydrogen (H) may cause hydrogen delayed fracture of a hot-formed member together with hydrogen (H) introduced into the steel sheet from a heating furnace in a later hot forming process. However, the Al—Fe coating layer of the present disclosure has a melting point of greater than 1000° C., higher than a heating temperature in a general hot forming process, and thus, the Al—Fe coating layer does not melt. Thus, the inventors have confirmed that the amount of hydrogen (H) introduced into the base steel sheet from a heating furnace during a hot forming process was not markedly increased owing to the Al—Fe coating layer, and it has been analyzed that if the content of hydrogen (H) in a batch-annealed steel sheet is 0.5 ppmw or less, a hot-formed member does not undergo hydrogen delayed fracture.

In addition, according to the present disclosure, an oxide layer is formed on the Al—Fe alloy coating layer, and in this case, the oxide layer is required to have an average oxygen weight percent of 20% or less at a depth of 0.1 μm from the surface of the coated steel sheet.

In addition, according to the present disclosure, the coated steel sheet, including the base steel sheet having the above-described composition and the Al—Fe alloy coating layer, is hot formed, and thus a desired microstructure may be obtained in a final formed member. In the present disclosure, the microstructure of the formed member is not particularly limited as long as the formed member has a tensile strength of 1000 MPa or greater. However, the formed member of the present disclosure may have martensite or bainite as a main phase, and retained austenite in an amount of 30% or less for increasing ductility. In addition, it may be preferable that the formed member have ferrite in an amount of 5% or less. If the content of ferrite is greater than 5%, a strength decrease may occur, and crashworthiness and impact toughness may be easily decreased because cracks may easily develop along a ferrite network.

Next, a method of manufacturing an Al—Fe coated steel sheet and a method of manufacturing a formed member will be described in detail according to embodiments of the present disclosure.

First, a method of manufacturing an Al—Fe coated steel sheet will be described according to an embodiment of the present disclosure.

According to the embodiment of the present disclosure, an Al—Si coating layer is formed on a base steel sheet having the above-described composition.

In the embodiment of the present disclosure, a cold-rolled steel sheet or a pickled hot-rolled steel sheet manufactured through well-known manufacturing processes may be used as the base steel sheet without specific limitations on manufacturing conditions thereof. Example manufacturing processes will now be briefly described.

First, according to the embodiment of the present disclosure, a steel slab having the above-described composition is heated at 1000° C. to 1300° C. and is then hot rolled. If the heating temperature is less than 1000° C., it is difficult to homogenize the microstructure of the slab, and if the heating temperature is greater than 1300° C., an oxide layer may be excessively formed and manufacturing costs may increase.

Thereafter, a finish hot rolling process is performed at a temperature within a range of Ar3 to 1000° C. If temperature of the finish hot rolling process is equal to or lower than Ar3, two-phase rolling may easily occur, and thus it may be difficult to control the structure of surface mixed grains and the formation of a steel sheet. If the temperature of the finish hot rolling process is greater than 1000° C., coarse grains may be easily formed during the finish hot rolling process.

In addition, a coiling process is performed at a temperature of higher than Ms temperature but equal to or less than 750° C. If the coiling temperature is equal to or lower than the Ms temperature, the strength of a hot-rolled material is excessively high, and thus it may be difficult to perform a subsequent cold rolling process. If the coiling temperature is greater than 750° C., the thickness of an oxide layer excessively increases, and thus it is difficult to perform a surface pickling process.

The hot-rolled steel sheet may be coated with Al—Si immediately after a pickling process. Alternatively, a pickling process and a cold rolling process may be performed to control the thickness of the steel sheet more precisely. The reduction ratio of the cold rolling process after the pickling process is not particularly limited. However, the reduction ratio may be within the range of 30% to 80% to obtain a desired thickness. In addition, if necessary, a batch annealing process may be performed on the hot-rolled steel sheet or the picked hot-rolled steel sheet before the cold rolling process so as to reduce the process load in the cold rolling process.

In this case, conditions of the batch annealing process are not particularly limited. However, the batch annealing process may be performed at 400° C. to 700° C. for 1 to 100 hours to reduce the strength of the hot-rolled steel sheet and thus reduce the process load during the cold rolling process.

A cold-rolled steel sheet obtained as described above may be processed through a continuous annealing process and an Al—Si coating process. The continuous annealing process is not limited to particular conditions. However, the continuous annealing process may preferably be performed at a temperature of 700° C. to 900° C.

Thereafter, according to the embodiment of the present disclosure, an Al—Si coating process is performed by passing the heat-treated steel sheet through a coating bath, and at this time, the coating bath may include aluminum (Al) as a main component, silicon (Si) in an amount of 6% to 12%, iron (Fe) in an amount of 1% to 4%, and other impurities.

In addition, preferably, the coating amount of Al—Si may be adjusted to be within the range of 30 g/m$^2$ to 130 g/m$^2$ on each side under general manufacturing conditions. If the coating amount is less than 30 g/m$^2$ on each side, it is difficult to impart a desired degree of corrosion resistance to a hot-formed member. Conversely, if the coating amount is greater than 130 g/m$^2$ on each side, manufacturing costs may increase because the coating amount is excessive, and it may be difficult to coat the steel sheet uniformly in width and length directions of a coil.

Thereafter, conditions of a batch annealing process for the steel sheet (coil) which are required for achieving objectives of the present disclosure will be described in detail.

The Al—Si coated steel sheet prepared as described above is heated in a batch annealing furnace. In this case, the atmosphere in the batch annealing furnace may preferably have a dew point of less than −10° C. If the dew point is −10° C. or higher, large amounts of oxides may be formed on the steel sheet, and thus the spot weldability of the steel sheet may deteriorate after a hot forming process. In addition, batch annealing equipment may be negatively affected by oxidation, thereby increasing equipment maintenance costs and decreasing the lifespan of the equipment. Therefore, air is not used as the gas atmosphere of the furnace, but another gas such as nitrogen or hydrogen having a sufficiently low dew point is used as the gas atmosphere of the furnace.

In addition, the steel sheet may be heated to a target maximum heat treatment temperature preferably at a rate of 1° C./hr to 500° C./hr. If the heating rate is less than 1° C./hr, excessive amounts of oxides are formed on the coating layer because of oxygen existing as an impurity in the furnace, and thus productivity may markedly decrease in addition to difficulty in guaranteeing spot weldability after a hot forming process. Conversely, if the heating rate is greater than 500° C./hr, a non-alloyed layer may partially remain on the coating layer, thereby leading to separation of the coating layer in a subsequent roll leveling process of the steel sheet (coil).

In addition, preferably, the maximum heat treatment temperature may be maintained within the range of 450° C. to 750° C. for 1 to 100 hours. If the maximum heat treatment temperature is less than 450° C., alloying may not sufficiently occur in a surface layer of the coating layer, and thus the coating layer may easily be separated during a roll leveling process. However, if the maximum heat treatment temperature is greater than 750° C., oxides may be excessively formed on the coating layer, and thus spot weldability may deteriorate after a hot forming process.

In addition, if the maximum heat treatment temperature is maintained for less than 1 hour, the coating layer may not be sufficiently alloyed, and if the maximum heat treatment temperature is maintained for longer than 100 hours, productivity may be decreased.

In addition, according to an embodiment of the present disclosure, a process in which the Al—Si coated steel sheet is maintained at a constant temperature may additionally be performed before the Al—Si coated steel sheet is heated to the maximum heat treatment temperature. This maintaining process is for removing rust preventive oil or rolling oil, reducing voids in the coating layer by inducing balanced stable diffusion of elements such as iron (Fe) into the base steel sheet, and making the thickness of an Al—Fe coating layer uniform.

In the maintaining process, it may be preferable that the Al—Si coated steel sheet be maintained at a temperature equal to or higher than 300° C. but less than the melting point of an Al—Si coating layer for 1 to 100 hours. If the maintaining temperature is less than 300° C., it is difficult to obtain the above-described effects, and if the maintaining temperature is equal to or greater than the melting point of the Al—Si coating layer, the Al—Si coating layer melts to result in an uneven surface.

In addition, after the batch annealing process, an Al—Fe alloy coating layer having the following structure is formed on the base steel sheet.

First, an Al—Fe alloy layer I having a Vickers hardness of 200 to 800 is formed on the base steel sheet, and an Al—Fe alloy layer III having a Vickers hardness of 700 to 1200 is formed on the Al—Fe alloy layer I. Then, an Al—Fe alloy layer II having a Vickers hardness of 400 to 900 is formed in the Al—Fe alloy layer III continuously or discontinuously in the length direction of the Al—Fe alloy layer III.

In addition, it may be preferable that the content of aluminum (Al) in the Al—Fe alloy layer I be within the range of 5% to 30% by weight, the content of aluminum (Al) in the Al—Fe alloy layer II be within the range of 20% to 50% by weight, and the content of aluminum (Al) in the Al—Fe alloy layer III be within the range of 40% to 70% by weight.

In addition, according to the present disclosure, it may be preferable that the cross-sectional area fraction of an Al—Fe intermetallic compound phase having an aluminum (Al) content of 70% or less by weight is greater than 99% in the Al—Fe coating layer. More preferably, the cross-sectional area fraction may be 100%, that is, complete alloying.

Thereafter, the steel sheet (coil) coated with the alloy coating layer is cooled in the furnace or is air-cooled.

In the present disclosure, preferably, the content of hydrogen (H) in the base steel sheet of the batch-annealed steel sheet manufactured by the above-described method may be 0.5 ppmw or less. Reasons for this have already been described.

In addition, according to the present disclosure, the content of oxygen at a depth of 0.1 μm from the surface of the coating layer of the batch-annealed steel sheet may preferably be 20% or less by weight. If the content of oxygen is greater than 20%, oxides are formed on the surface of a hot-formed member to a large thickness in a later process, and thus the spot weldability of the hot-formed member deteriorates.

Figure 2:
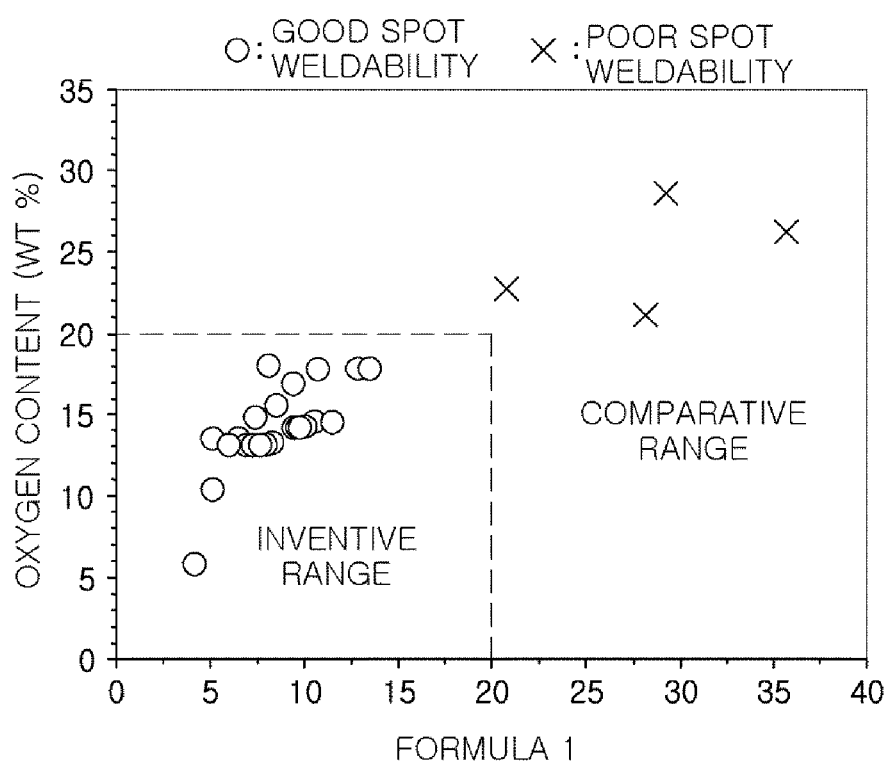
FIG. 2 is a view illustrating a relationship between batch annealing conditions (Formula 1) and the content of oxygen at a depth of 0.1 μm from a coating layer surface.

In addition, the above-described conditions of the batch annealing process are closely related to the content of oxygen existing on the surface of the coating layer and also to the spot weldability of a hot-formed member. The inventors have conducted a great deal of research into this relationship and found that if batch annealing conditions are controlled using the following formula 1, the content of oxygen (O) in oxides at a depth of 0.1 μm from the surface of a coating layer of an Al—Fe coated steel sheet could be 20% or less by weight, and a hot-formed member could have high spot weldability. Specifically, as shown in FIG. 2, it has been confirmed that when the following formula 1 is 20 or less, the content of oxygen (O) in oxides at a depth of 0.1 μm from the surface of a coating layer of an Al—Fe coated steel sheet is 20% or less by weight, and in this case, a final hot-formed member has high spot weldability.

$$\exp\left(\frac{DP}{50}\right) * \exp\left(-\frac{3000}{T_{max}}\right) * \sqrt{\left(\frac{T_{max}}{HR} + 10 * t_{mid} + 50 * t_{max}\right) * 1000} \leq 20 \quad \text{[Formula 1]}$$

where DP refers to a dew point (° C.), $T_{max}$ refers to a maximum temperature (K) in a batch annealing heat treatment, HR refers to a heating rate (° C./hr), $t_{mid}$ (time) refers to a maintaining time during which an intermediate temperature is maintained, and $t_{max}$ (time) refers to a maintaining time during which the maximum temperature is maintained.

Next, a method of manufacturing a formed member having high hydrogen delayed fracture resistance and spot weldability by using an Al—Fe coated steel sheet manufactured as described above will be described.

First, a coated steel sheet having an Al—Fe coating layer is heated at a heating rate of 1° C./s to 1000° C./s to a temperature equal to or higher than an austenite single phase region.

If the heating rate is less than 1° C./s, it may be difficult to guarantee sufficient productivity. In addition, due to an excessive heating time, the grain size of the steel sheet excessively increases to result in a decrease in impact toughness, and oxides may be excessively formed on the surface of the formed member to result in a decrease in spot weldability. However, if the heating rate is greater than 1000° C./s, expensive equipment may be required.

Next, preferably, the steel sheet may be maintained at a heating temperature ranging from Ae3+30° C. to Ae3+150° C. for 1 second to 1000 seconds. If the heating temperature is less than Ae3+30° C., the possibility of ferrite formation is high while a blank is transferred from a heating furnace to a die, and thus it is difficult to guarantee strength. In addition, if the heating temperature is greater than Ae3+150° C., it is difficult to guarantee spot weldability because of excessive formation of oxides on the surface of the member.

In addition, according to the present disclosure, the formed member is cooled to a temperature equal to or lower than $M_f$ simultaneously with a hot forming process, and in this case, the cooling rate may preferably be adjusted to be within the range of 1° C./s to 1000° C./s. If the cooling rate is less than 1° C./s, undesired ferrite is formed, and thus it is difficult to obtain a tensile strength of 1000 MPa or greater. In addition, expensive equipment is required to adjust the cooling rate to be greater than 1000° C./s.

Preferably, the hot-formed member manufactured as described above may have a tensile strength of 1000 MPa or greater, and the product of the tensile strength of the hot-formed member and the hydrogen content in a base steel sheet may be less than 1300. If the product is 1300 or greater, a fracture occurs before reaching a maximum strength value in a tension test, and it is difficult to guarantee sufficient elongation.

In addition, the average oxygen content of surface oxides formed on the member may preferably be 40% or less by weight at a depth of 0.1 μm from the surface of the steel sheet. If the oxygen content is greater than 40%, spot weldability deteriorates because the range of current available for spot welding is less than 1 kA.

MODE FOR INVENTION

Hereinafter, the embodiments of the present disclosure will be described more specifically through examples.

Example 1

TABLE 1

| Steel | Chemical composition (wt %) | | | | | | | | | | Notes |
| | C | Si | Mn | P | S | Al | Cr | Ti | B | N | others | |
| --- | --- | --- | --- | --- | --- | --- | --- | --- | --- | --- | --- | --- |
| A | 0.24 | 0.2 | 1.2 | 0.015 | 0.003 | 0.03 | 0.2 | 0.03 | 0.0020 | 0.0035 | Tr | Inventive Example |

Slabs having a thickness of 40 mm were prepared in a vacuum melting method using general 22MnB5 steel having the composition shown in Table 1. The slabs were heated in a heating furnace at 1200° C. for 1 hour, and a hot rolling process was performed on the slabs to finally manufacture hot-rolled steel sheets having a thickness of 3 mm. At that time, the hot rolling process was performed under the following conditions: a hot rolling finish temperature of 900° C., and an in-furnace cooling temperature of 550° C.

Next, the hot-rolled steel sheets were pickled and were cold rolled with a reduction ratio of 50%. The cold-rolled steel sheets were annealed at 780° C. and were coated with aluminum (Al). At this time, the composition of an Al coating bath was Al-9% Si-2% Fe and other impurities, and the coating amount was 80 g/m² on each side.

TABLE 2

| No. | Batch annealing atmosphere | | | | Batch annealing heat treatment conditions | | | | | Formula 1 | Notes |
|---|---|---|---|---|---|---|---|---|---|---|---|
| | Hydrogen content[1] | Nitrogen content[1] | Oxygen content[1] | Dew point (° C.) | Heating rate (° C./hr) | Maintaining temperature (° C.) | Maintaining time (hr) | Maximum temperature (° C.) | Maintaining time (hr) | | |
| A-1 | 0.00001 | 98.7 | 1.2 | −15 | 50 | 500 | 5 | 650 | 10 | 17.7 | Inventive Example |
| A-2 | 3 | 96.9 | 0.003 | −35 | 50 | 500 | 5 | 650 | 10 | 14.5 | Inventive Example |
| A-3 | 99.99 | Tr | 0.0005 | −40 | 50 | 500 | 5 | 650 | 10 | 13.1 | Inventive Example |
| A-4 | 0.00005 | 78.1 | 21 | 10 | 50 | 500 | 5 | 650 | 10 | 35.7 | Comparative Example |
| A-5[2] | — | — | — | — | — | — | — | — | — | — | Comparative Example |

[1] Unit: volume fraction (Vol. %)
[2] General Al plated material on which a batch annealing process was not performed Formula 1: $\exp\left(\dfrac{DP}{50}\right) * \exp\left(-\dfrac{3000}{T_{max}}\right) * \sqrt{\left(\dfrac{T_{max}}{HR} + 10 * t_{mid} + 50 * t_{max}\right) * 1000} \leq 20$ where DP (° C.): dew point, Tmax (K): maximum temperature of batch annealing heat treatment, HR (° C./hr): heating rate, tmid (time): maintaining time at intermediate temperature, and tmax (time): maintaining time at maximum temperature.

The steel sheets manufactured as described above were batch annealed under different atmosphere conditions as shown in Table 2 above. The same batch annealing heat treatment conditions were used: a heating rate from room temperature to a target temperature was 50° C./hr, an intermediate maintaining temperature and time before reaching the target temperature were 500° C. and 5 hours, a maximum target temperature and a maintaining time at the maximum target temperature were 650° C. and 10 hours, and then cooling to room temperature was performed for 20 hours. Conventional Example A-5 was a general Al-coated steel sheet on which a batch annealing was not performed, and Comparative Example A-4 had a relatively high oxygen content and dew point compared to other inventive examples.

The hardness, Al content, Al—Fe intermetallic compound fraction, and surface oxygen content of each batch-annealed Al—Fe coating layer, the hydrogen content of each base steel sheet, and separation of the coating layers were measured, and results thereof are shown in Table 3 below. Here, Vickers hardness refers to an average value of hardness values measured at three points of each coating layer using a weight of 1 g, and the oxygen content refers to a value measured at a depth of 0.1 μm from the surface of each coating layer using a GDS device. The Al—Fe intermetallic compound fraction refers to a fraction of an alloyed Al—Fe intermetallic compound area measured by subtracting a non-alloyed Al area from the entire analysis area in a cross-section of each coating layer by an optical method. In addition, the Al content of each Al—Fe coating layer was measured by spot EDS using an SEM, and the hydrogen content in each base steel sheet was measured by measuring the amount of hydrogen emitted from a sample by gas chromatography while heating the sample to 300° C. at a rate of 100° C./hr. In addition, after each batch-annealed Al—Fe coated steel sheet was passed through a roll leveller at a plastic fraction of 70% for shape correction, peeling resistance was evaluated as X if separation of the coating layer occurred and as O if separation of the coating layer did not occur.

TABLE 3

| No. | Vickers hardness[1] | | | Oxygen content (wt %)[2] | Al—Fe fraction (%) | Al content (wt %) in Al—Fe layer | | | Hydrogen Content (ppmw)[4] | Separation[5] | Notes |
|---|---|---|---|---|---|---|---|---|---|---|---|
| | Layer I | Layer II | Layer III | | | Layer I | Layer II | Layer III | | | |
| A-1 | 526 | 704 | 902 | 12.8 | 99.8 | 14 | 33 | 54 | 0.008 | O | Inventive Example |
| A-2 | 426 | 818 | 1067 | 10.5 | 99.9 | 16 | 38 | 53 | 0.26 | O | Inventive Example |
| A-3 | 525 | 728 | 920 | 7.4 | 99.7 | 13 | 35 | 57 | 0.37 | O | Inventive Example |
| A-4 | 444 | 657 | 993 | 26.2 | 99.6 | 12 | 36 | 56 | 0.052 | O | Comparative Example |
| A-5 | 811 | — | 60 | 3.3 | 19.4[3] | 59 | — | 94 | 0.037 | O | Comparative Example |

[1] Vickers hardness (Hv, 1 g): load 1 g, nano-Vickers
[2] Oxygen wt % at a depth of 0.1 μm from a surface by GDS analysis
[3] Thickness fraction of inhibition layer in Al plated material
[4] ppmw: ppm by weight of hydrogen
[5] Plating layer separation after roll leveller, occurred: X, did not occur: O As shown in Tables 1 to 3 above, Inventive Examples A-1, A-2, and A-3 satisfying steel composition requirements and batch annealing conditions did not show coating separation when passing through the roll leveller. In addition, the hydrogen content in the base steel sheet of Inventive Example A-1 was lower than the hydrogen contents in the base steel sheets of Inventive Examples A-2 and A-3.

FIG. 1C is an optical photograph of Inventive Example A-3 including: an Al—Fe alloy layer I having an Al content of 13% and a Vickers hardness of 525 and directly formed above the base steel sheet; an Al—Fe coating layer II having an Al content of 35% and a Vickers hardness of 728, the Al—Fe alloy layer II being continuous or discontinuous in the length direction of the coated steel sheet; and an Al—Fe coating layer III having an Al content of 57% and a Vickers hardness of 920.

However, in Conventional Example A-5 being an Al coated steel sheet which was not batch annealed, as shown in FIG. 1A, a coating layer III had a very low Vickers hardness on the level of 60, and an inhibition layer I between the coating layer III and the base steel sheet had a Vickers hardness of 811. In addition, when compared to other examples, the fraction of an alloyed Al—Fe intermetallic compound area not including a non-alloyed Al area was relatively low at 19.4%.

In addition, Comparative Example A-4 had a higher oxygen content than Inventive Examples.

Next, a hot forming process was performed on batch-annealed samples under the following heat treatment conditions. That is, samples prepared as described above were inserted into a heating furnace previously heated to 900° C. and held in the heating furnace for 6 minutes, and were air cooled for 12 seconds. Thereafter, the samples were hot formed using a die and were rapidly cooled to room temperature at a cooling rate of 30° C./s or greater.

A tension test was performed on specimens taken from the samples according to ASTM E8. A specimen fractured before the maximum strength in a tensile strength curve was indicated with X, and a specimen fractured after the maximum strength in a tensile strength curve was indicated with O. Results thereof are shown in Table 4 below. In addition, the hydrogen content of the base steel sheet and the oxygen content of the coating layer were analyzed in the same manner as in Table 3, and results thereof are shown in Table 4 below. In addition, spot welding current ranges thereof were evaluated by ISO 18278-2.

As shown in Table 4 above, Inventive Examples A-1, A-2, and A-3 had proper tensile characteristics and spot welding current ranges.

However, Conventional Example A-5 had a large amount of hydrogen in the base steel sheet after the hot forming process, and thus had low elongation because a fracture occurred before the maximum strength in the tension test.

In addition, a large amount of oxygen was detected in Comparative Example A-4 because of large amounts of surface oxides, and thus it was difficult to guarantee a spot welding current range of 1 kA or greater.

Example 2

Al coated steel sheets were prepared as in Example 1. The compositions and manufacturing conditions of base steel sheets of the Al coated steel sheets were the same as in Example 1. In addition, a coating process for coating the base steel sheets with aluminum (Al) was performed in the same manner as in Example 1.

A batch annealing process was performed on the Al coated steel sheets prepared as described above under batch annealing heat treatment conditions as shown in Table 5 below. Comparative Example A-5 had an excessive intermediate maintaining time, Comparative Examples A-6 and A-7 had batch annealing heat treatment temperatures outside of the range proposed in the present disclosure, and Comparative Examples A-10 and A-11 had heating rates outside of the range proposed in the present disclosure.

The hardness, Al content, fraction, content, and separation of each batch-annealed Al—Fe coating layer were measured in the same manner as in Example 1, and results thereof are shown in Table 6 below.

TABLE 4

| | HPF heat treatment | | | | Tensile | | | | Spot welding | |
| | | Dew | | | Hydrogen | characteristics | | | Oxygen | current | |
| No. | Atmosphere | point (° C.) | Temperature (° C.) | Time (min) | content (ppmw) | TS (MPa) | TS × H [1] | Fracture [2] | content (wt %) [3] | range (kA) [4] | Notes |
|---|---|---|---|---|---|---|---|---|---|---|---|
| A-1 | air | 25 | 900 | 6 | 0.49 | 1657 | 810 | O | 26.3 | 1.7 | Inventive Example |
| A-2 | air | 25 | 900 | 6 | 0.58 | 1648 | 960 | O | 22.4 | 1.8 | Inventive Example |
| A-3 | air | 25 | 900 | 6 | 0.61 | 1626 | 990 | O | 20.6 | 2 | Inventive Example |
| A-4 | air | 25 | 900 | 6 | 0.53 | 1661 | 880 | O | 44.8 | 0.7 | Comparative Example |
| A-5 | air | 25 | 900 | 6 | 0.95 | 1453 | 1380 | X | 10.4 | 2.4 | Comparative Example |

[1] TS × H: product of maximum strength (MPa) and hydrogen content (ppmw) in base steel sheet

[2] Before the maximum strength in a tensile strength curve, fracture occurred: X, did not occur: O

[3] Oxygen wt % at a depth of 0.1 μm from a surface by GDS analysis

[4] ISO 18278-2

TABLE 5

| No. | Batch annealing atmosphere | | | | Batch annealing heat treatment conditions | | | | | Formula 1 | Notes |
|---|---|---|---|---|---|---|---|---|---|---|---|
| | Hydrogen content[1] | Nitrogen content[1] | Oxygen content[1] | Dew point (° C.) | Heating rate (° C./hr) | Maintaining temperature (° C.) | Maintaining time (hr) | Maximum temperature (° C.) | Maintaining time (hr) | | |
| A-1 | 99.99 | Tr. | 0.001 | −40 | 50 | 500 | 5 | 700 | 10 | 15.5 | Inventive Example |
| A-2 | 99.99 | Tr. | 0.001 | −40 | 50 | — | — | 700 | 10 | 14.8 | Inventive Example |
| A-3 | 99.99 | Tr. | 0.001 | −40 | 50 | 500 | 24 | 700 | 10 | 17.9 | Inventive Example |
| A-4 | 99.99 | Tr. | 0.001 | −40 | 50 | 500 | 150 | 700 | 10 | 29.3 | Comparative Example |
| A-5 | 99.99 | Tr. | 0.001 | −40 | 50 | 500 | 5 | 500 | 24 | 10.4 | Inventive Example |
| A-6 | 99.99 | Tr. | 0.001 | −40 | 50 | 500 | 5 | 800 | 10 | 20.7 | Comparative Example |
| A-7 | 99.99 | Tr. | 0.001 | −40 | 50 | — | — | 400 | 24 | 5.7 | Comparative Example |
| A-8 | 20 | 79.9 | 0.002 | −38 | 3 | 500 | 5 | 650 | 10 | 16.8 | Inventive Example |
| A-9 | 20 | 79.9 | 0.002 | −38 | 400 | 500 | 5 | 650 | 10 | 13.5 | Inventive Example |
| A-10 | 20 | 79.9 | 0.002 | −38 | 0.5 | 500 | 5 | 650 | 10 | 28.1 | Comparative Example |
| A-11 | 20 | 79.9 | 0.002 | −38 | 1000 | 500 | 5 | 650 | 10 | 13.5 | Comparative Example |

[1] Unit: volume fraction (Vol. %)

Formula 1: $\exp\left(\dfrac{DP}{50}\right) * \exp\left(-\dfrac{3000}{T_{max}}\right) * \sqrt{\left(\dfrac{T_{max}}{HR} + 10 * t_{mid} + 50 * t_{max}\right) * 1000} \leq 20$ where DP (° C.): dew point, Tmax (K): maximum temperature of batch annealing heat treatment, HR (° C./hr): heating rate, tmid (time): maintaining time at intermediate temperature, and tmax (time): maintaining time at maximum temperature.

TABLE 6

| No. | Vickers hardness[1] | | | Oxygen content (wt %)[2] | Al—Fe fraction (%) | Al content (wt %) in Al—Fe layer | | | Hydrogen Content (ppmw)[4] | Separation[5] | Notes |
|---|---|---|---|---|---|---|---|---|---|---|---|
| | Layer I | Layer II | Layer III | | | Layer I | Layer II | Layer III | | | |
| A-1 | 511 | 748 | 897 | 8.5 | 99.9 | 14 | 33 | 53 | 0.28 | ○ | Inventive Example |
| A-2 | 528 | 754 | 915 | 7.4 | 99.7 | 13 | 31 | 55 | 0.25 | ○ | Inventive Example |
| A-3 | 522 | 737 | 886 | 8.1 | 99.8 | 15 | 35 | 54 | 0.27 | ○ | Inventive Example |
| A-4 | 435 | 643 | 776 | 28.6 | 100 | 8 | 28 | 45 | 0.58 | ○ | Comparative Example |
| A-5 | 726 | 703 | 1026 | 5.1 | 99.8 | 22 | 42 | 61 | 0.21 | ○ | Inventive Example |
| A-6 | 448 | 648 | 846 | 22.8 | 100 | 9 | 29 | 47 | 0.3 | ○ | Comparative Example |
| A-7 | 816 | 864 | 55 | 4.2 | 58.4 | 16 | 48 | 92 | 0.09 | X | Comparative Example |
| A-8 | 487 | 627 | 824 | 9.4 | 100 | 15 | 32 | 51 | 0.35 | ○ | Inventive Example |
| A-9 | 459 | 767 | 983 | 6.5 | 99.2 | 13 | 34 | 50 | 0.25 | ○ | Inventive Example |
| A-10 | 461 | 613 | 768 | 21.1 | 100 | 16 | 30 | 49 | 0.57 | ○ | Comparative Example |
| A-11 | 447 | 924 | 78 | 5.1 | 85.6 | 15 | 47 | 93 | 0.18 | X | Comparative Example |

[1] Vickers hardness (Hv, 1 g): load 1 g, nano-Vickers
[2] Oxygen wt % at a depth of 0.1 μm from a surface by GDS analysis
[3] Thickness fraction of inhibition layer in Al plated material
[4] ppmw: ppm by weight of hydrogen
[5] Plating layer separation after roll leveller, occurred: X, did not occur: ○

As shown in Tables 5 and 6, Inventive Examples A-1, A-2, A-3, A-5, A-8, and A-9 satisfying batch annealing heat treatment conditions of the present disclosure had proper properties such as a surface oxygen content and a base steel sheet hydrogen content, and peeling resistance thereof was also high.

Although coating layer separation was not observed from Comparative Examples A-4 and A-6, the surface oxygen contents of Comparative Examples A-4 and A-6 were high. Alloying did not completely occur in Comparative Examples A-7 and A-11, and thus, when Comparative Examples A-7 and A-11 passed through a roll leveller, coating layers thereof were separated. In addition, Comparative Example A-10 had a high hydrogen content in the base steel sheet.

FIG. 1B illustrates Comparative Example A-7 alloyed to a degree of about 58%, Comparative Example A-7 including a coating layer I formed directly above a base steel sheet and having an Al content of 16% and a Vickers hardness of 816, an Al—Fe coating layer II having an Al content of about 48% and a Vickers hardness of 846, and an Al coating layer III having an Al content of about 92% and a Vickers hardness of 55.

Thereafter, batch-annealed samples were hot formed under heat treatment conditions shown in Table 7 below, and other air cooling and rapid cooling processes were performed in the same manner as in Example 1. Then, a tension test, content evaluation, and spot welding current range evaluation were performed on the samples in the same manner as in Example 1, and results thereof are shown in Table 7 below.

TABLE 7

| | | HPF heat treatment | | | | Tensile characteristics | | | Spot welding | |
| No. | Atmosphere | Dew point (° C.) | Temperature (° C.) | Time (min) | Hydrogen content (ppmw) | TS (MPa) | TS × H [1] | Fracture [2] | Oxygen content (wt %) [3] | current range (kA) [4] | Notes |
|---|---|---|---|---|---|---|---|---|---|---|---|
| A-1 | air | 26 | 900 | 6 | 0.45 | 1638 | 740 | ○ | 21.8 | 1.9 | Inventive Example |
| A-2 | air | 26 | 900 | 6 | 0.42 | 1646 | 690 | ○ | 20 | 2 | Inventive Example |
| A-3 | nitrogen | −5 | 900 | 6 | 0.38 | 1636 | 620 | ○ | 13.4 | 2.2 | Inventive Example |
| A-4 | air | 26 | 900 | 6 | 0.98 | 1427 | 1400 | X | 43.5 | 0.3 | Comparative Example |
| A-5 | air | 26 | 900 | 6 | 0.43 | 1631 | 700 | ○ | 18.6 | 2.1 | Inventive Example |
| A-6 | air | 26 | 900 | 6 | 0.55 | 1664 | 920 | ○ | 41.8 | 0.9 | Comparative Example |
| A-8 | air | 24 | 900 | 6 | 0.55 | 1627 | 890 | ○ | 21.8 | 1.9 | Inventive Example |
| A-9 | air | 24 | 900 | 6 | 0.44 | 1665 | 730 | ○ | 19.7 | 2 | Inventive Example |
| A-10 | air | 24 | 900 | 6 | 0.93 | 1497 | 1390 | X | 27.1 | 1.4 | Comparative Example |

[1] TS × H: product of maximum strength (MPa) and hydrogen content (ppmw) in base steel sheet
[2] Before the maximum strength in a tensile strength curve, fracture occurred: X, did not occur: ○
[3] Oxygen wt % at a depth of 0.1 pm from a surface by GDS analysis
[4] ISO 18278-2

As shown in Table 7 above, Comparative Example A-4 did not show a normal fracture in the tension test because of a high hydrogen content in the base steel sheet, and had difficulty in guaranteeing a sufficient spot welding current range because of an excessive surface oxygen content.

In addition, Comparative Example A-6 showed a normal fraction in the tension test but did not have a proper current range, and Comparative Example A-10 did not have sufficient elongatation because of a high hydrogen content in the base steel sheet.

Example 3

Slabs having a thickness of 40 mm and compositions as shown in Table 8 below were prepared by a vacuum melting method, and were hot rolled, cold rolled, annealed, and coated with aluminum (Al) to manufacture Al coated steel sheets under the same conditions as in Example 1. In Table below, steels P and Q had a carbon, manganese, or aluminum content outside of the range proposed in the present disclosure.

TABLE 8

| | Chemical composition (wt %) | | | | | | | | | | | |
| Steels | C | Si | Mn | P | S | Al | Cr | Ti | B | N | others | Notes |
|---|---|---|---|---|---|---|---|---|---|---|---|---|
| A | 0.20 | 0.30 | 1.3 | 0.013 | 0.002 | 0.05 | | 0.04 | 0.0027 | 0.0043 | Nb: 0.05 | Inventive Example |
| B | 0.22 | 0.20 | 1.1 | 0.014 | 0.003 | 0.04 | | 0.03 | 0.0025 | 0.0040 | Mo: 0.1 | Inventive Example |

TABLE 8-continued

| Steels | Chemical composition (wt %) | | | | | | | | | | | Notes |
|---|---|---|---|---|---|---|---|---|---|---|---|---|
| | C | Si | Mn | P | S | Al | Cr | Ti | B | N | others | |
| C | 0.21 | 0.20 | 1.2 | 0.015 | 0.004 | 0.02 | | 0.02 | 0.0021 | 0.0027 | Ni: 0.2 Cu: 0.5 | Inventive Example |
| D | 0.22 | 0.30 | 1.4 | 0.017 | 0.001 | 0.06 | | 0.04 | 0.0024 | 0.0034 | V: 0.4 | Inventive Example |
| E | 0.22 | 0.20 | 1.1 | 0.011 | 0.005 | 0.03 | | 0.02 | 0.0019 | 0.0053 | Zr: 0.05 | Inventive Example |
| F | 0.21 | 0.20 | 1.2 | 0.015 | 0.002 | 0.04 | | 0.03 | 0.0022 | 0.0037 | W: 0.1 | Inventive Example |
| G | 0.23 | 0.30 | 1.3 | 0.012 | 0.004 | 0.03 | | 0.04 | 0.0017 | 0.0075 | Sb: 0.05 | Inventive Example |
| H | 0.22 | 0.20 | 1.1 | 0.011 | 0.003 | 0.05 | | 0.03 | 0.028 | 0.0023 | Sn: 0.05 | Inventive Example |
| I | 0.22 | 0.03 | 1.6 | 0.016 | 0.002 | 0.02 | | 0.04 | 0.0032 | 0.0124 | | Inventive Example |
| J | 0.22 | 1.20 | 0.1 | 0.014 | 0.002 | 0.04 | 2.9 | 0.03 | 0.0021 | 0.0042 | | Inventive Example |
| K | 0.23 | 0.04 | 0.3 | 0.012 | 0.004 | 0.03 | 1.4 | 0.04 | 0.0028 | 0.0054 | | Inventive Example |
| L | 0.15 | 0.08 | 4.2 | 0.007 | 0.002 | 0.04 | | | | 0.0037 | | Inventive Example |
| M | 0.22 | 0.11 | 7.3 | 0.013 | 0.005 | 0.05 | | | | 0.0048 | | Inventive Example |
| N | 0.22 | 0.80 | 0.1 | 0.017 | 0.004 | 0.13 | 1.2 | 0.03 | 0.0024 | 0.0046 | | Inventive Example |
| O | 0.39 | 1.10 | 0.9 | 0.013 | 0.002 | 0.05 | 0.2 | 0.04 | 0.0025 | 0.0037 | | Inventive Example |
| P | 0.06 | 0.6 | 1.2 | 0.018 | 0.004 | 0.03 | | 0.08 | | 0.0043 | | Comparative Example |
| Q | 0.6 | 1.5 | 16 | 0.021 | 0.007 | 2.1 | | | | 0.0074 | | Comparative Example |

TABLE 9

| | Batch annealing atmosphere | | | | Batch annealing heat treatment conditions | | | | | | |
|---|---|---|---|---|---|---|---|---|---|---|---|
| No. | Hydrogen content[1] | Nitrogen content[1] | Oxygen content[1] | Dew point (° C.) | Heating rate (° C./hr) | Maintaining temperature (° C.) | Maintaining time (hr) | Maximum temperature (° C.) | Maintaining time (hr) | Formula 1 | Notes |
| A | 99.99 | Tr. | 0.001 | −40 | 50 | 500 | 5 | 650 | 10 | 13.1 | Inventive Example |
| B | 99.99 | Tr. | 0.001 | −40 | 50 | 500 | 5 | 650 | 10 | 13.1 | Inventive Example |
| C | 99.99 | Tr. | 0.001 | −40 | 50 | 500 | 5 | 650 | 10 | 13.1 | Inventive Example |
| D | 99.99 | Tr. | 0.001 | −40 | 50 | 500 | 5 | 650 | 10 | 13.1 | Inventive Example |
| E | 99.99 | Tr. | 0.001 | −40 | 50 | 500 | 5 | 650 | 10 | 13.1 | Inventive Example |
| F | 10 | 89.9 | 0.002 | −36 | 50 | 500 | 5 | 650 | 10 | 14.2 | Inventive Example |
| G | 10 | 89.9 | 0.002 | −36 | 50 | 500 | 5 | 650 | 10 | 14.2 | Inventive Example |
| H | 10 | 89.9 | 0.002 | −36 | 50 | 500 | 5 | 650 | 10 | 14.2 | Inventive Example |
| I | 10 | 89.9 | 0.002 | −36 | 50 | 500 | 5 | 650 | 10 | 14.2 | Inventive Example |
| J | 99.99 | Tr. | 0.001 | −40 | 50 | 500 | 5 | 650 | 10 | 13.1 | Inventive Example |
| K | 0.00001 | 97.9 | 2 | −15 | 50 | 500 | 5 | 650 | 10 | 17.7 | Inventive Example |
| L | 3 | 96.9 | 0.003 | −35 | 50 | 500 | 5 | 650 | 10 | 14.5 | Inventive Example |
| M | 0.00001 | 97.9 | 2 | −15 | 50 | 500 | 5 | 650 | 10 | 17.7 | Inventive Example |

TABLE 9-continued

| | Batch annealing atmosphere | | | | Batch annealing heat treatment conditions | | | | | | |
|---|---|---|---|---|---|---|---|---|---|---|---|
| No. | Hydrogen content[1] | Nitrogen content[1] | Oxygen content[1] | Dew point (° C.) | Heating rate (° C./hr) | Maintaining temperature (° C.) | Maintaining time (hr) | Maximum temperature (° C.) | Maintaining time (hr) | Formula 1 | Notes |
| N | 99.99 | Tr. | 0.001 | −40 | 50 | 500 | 5 | 650 | 10 | 13.1 | Inventive Example |
| O | 99.99 | Tr. | 0.001 | −40 | 50 | 500 | 5 | 650 | 10 | 13.1 | Inventive Example |
| P | 99.99 | Tr. | 0.001 | −40 | 50 | 500 | 5 | 650 | 10 | 13.1 | Comparative Example |
| Q | 99.99 | Tr. | 0.001 | −40 | 50 | 500 | 5 | 650 | 10 | 13.1 | Comparative Example |

[1]Unit: volume fraction (Vol. %)

Formula 1: $\exp\left(\frac{DP}{50}\right) * \exp\left(-\frac{3000}{T_{max}}\right) * \sqrt{\left(\frac{T_{max}}{HR} + 10 * t_{mid} + 50 * t_{max}\right) * 1000} \leq 20$ where DP (° C.): dew point, Tmax (K): maximum temperature of batch annealing heat treatment, HR (° C./hr): heating rate, tmid (time): maintaining time at intermediate temperature, and tmax (time): maintaining time at maximum temperature.

TABLE 10

| No. | Vickers hardness[1] | | | Oxygen content (wt %)[2] | Al—Fe fraction (%)[3] | Al content (wt %) in Al—Fe layer | | | Hydrogen Content (ppmw)[4] | Separation[5] | Notes |
|---|---|---|---|---|---|---|---|---|---|---|---|
| | Layer I | Layer II | Layer III | | | Layer I | Layer II | Layer III | | | |
| A | 964 | 776 | 517 | 8.2 | 99.9 | 55 | 33 | 15 | 0.31 | ○ | Inventive Example |
| B | 981 | 717 | 468 | 8.1 | 99.9 | 52 | 34 | 18 | 0.28 | ○ | Inventive Example |
| C | 927 | 896 | 497 | 7.9 | 100 | 53 | 30 | 14 | 0.29 | ○ | Inventive Example |
| D | 1057 | 747 | 503 | 6.9 | 99.7 | 53 | 36 | 12 | 0.27 | ○ | Inventive Example |
| E | 879 | 727 | 535 | 7.6 | 99.8 | 55 | 32 | 13 | 0.35 | ○ | Inventive Example |
| F | 1105 | 764 | 521 | 10.1 | 99.4 | 54 | 34 | 17 | 0.16 | ○ | Inventive Example |
| G | 946 | 807 | 473 | 9.4 | 99.8 | 51 | 35 | 18 | 0.24 | ○ | Inventive Example |
| H | 958 | 791 | 518 | 9.6 | 100 | 50 | 34 | 13 | 0.18 | ○ | Inventive Example |
| I | 1027 | 745 | 483 | 9.8 | 99.9 | 52 | 33 | 12 | 0.21 | ○ | Inventive Example |
| J | 1036 | 745 | 526 | 7.4 | 99.4 | 55 | 36 | 18 | 0.33 | ○ | Inventive Example |
| K | 997 | 765 | 579 | 13.4 | 99.5 | 54 | 32 | 14 | 0.008 | ○ | Inventive Example |
| L | 884 | 675 | 456 | 11.5 | 99.3 | 51 | 33 | 16 | 0.16 | ○ | Inventive Example |
| M | 967 | 634 | 443 | 10.7 | 99.2 | 56 | 31 | 15 | 0.007 | ○ | Inventive Example |
| N | 934 | 718 | 561 | 6.8 | 99.7 | 54 | 35 | 15 | 0.28 | ○ | Inventive Example |
| O | 994 | 726 | 542 | 7.1 | 99.9 | 55 | 34 | 16 | 0.27 | ○ | Inventive Example |
| P | 1064 | 687 | 514 | 7.6 | 100.0 | 52 | 37 | 12 | 0.31 | ○ | Comparative Example |
| Q | 864 | 618 | 428 | 6.0 | 99.2 | 52 | 31 | 14 | 0.32 | ○ | Comparative Example |

[1]Vickers hardness (Hv, 1 g): load 1 g, nano-Vickers
[2] Oxygen wt % at a depth of 0.1 μm from a surface by GDS analysis
[3] Thickness fraction of inhibition layer in Al plated material
[4] ppmw: ppm by weight of hydrogen
[5]Plating layer separation after roll leveller, occurred: X, did not occur: ○

A batch annealing process was performed on the steel sheets as shown in Table 9 below. The batch annealing process was performed under conditions proposed in the present disclosure. Then, the hardness, Al content, fraction, content, and separation of each batch-annealed Al—Fe coating layer were measured in the same manner as in Example 1, and results thereof are shown in Table 10 below. All the results of measurement were within the ranges proposed in the present disclosure.

TABLE 11

| No. | Atmosphere | HPF heat treatment Dew point (° C.) | Temperature (° C.) | Time (min) | Hydrogen content (ppmw) | TS (MPa) | TS × H[1] | Fracture[2] | Oxygen content (wt %)[3] | Spot welding current range (kA)[4] | Notes |
|---|---|---|---|---|---|---|---|---|---|---|---|
| A | air | 26 | 900 | 6 | 0.64 | 1516 | 970 | ○ | 24.6 | 1.7 | Inventive Example |
| B | air | 26 | 900 | 6 | 0.56 | 1568 | 880 | ○ | 25.3 | 1.6 | Inventive Example |
| C | air | 26 | 900 | 6 | 0.57 | 1569 | 890 | ○ | 23.8 | 1.7 | Inventive Example |
| D | air | 26 | 900 | 6 | 0.56 | 1548 | 870 | ○ | 22.1 | 1.8 | Inventive Example |
| E | air | 26 | 900 | 6 | 0.69 | 1502 | 1040 | ○ | 24.1 | 1.6 | Inventive Example |
| F | air | 26 | 900 | 6 | 0.53 | 1564 | 830 | ○ | 28.9 | 1.4 | Inventive Example |
| G | air | 26 | 900 | 6 | 0.57 | 1558 | 890 | ○ | 26.4 | 1.7 | Inventive Example |
| H | air | 26 | 900 | 6 | 0.54 | 1554 | 840 | ○ | 26.8 | 1.8 | Inventive Example |
| I | air | 26 | 900 | 6 | 0.55 | 1605 | 880 | ○ | 27.3 | 1.4 | Inventive Example |
| J | air | 26 | 900 | 6 | 0.66 | 1617 | 1070 | ○ | 24.9 | 1.9 | Inventive Example |
| K | air | 26 | 900 | 6 | 0.51 | 1587 | 810 | ○ | 32.5 | 1.2 | Inventive Example |
| L | air | 26 | 800 | 9 | 0.44 | 1567 | 690 | ○ | 18.4 | 2.2 | Inventive Example |
| M | air | 26 | 650 | 12 | 0.41 | 1346 | 550 | ○ | 13.5 | 2.3 | Inventive Example |
| N | air | 26 | 900 | 6 | 0.64 | 1476 | 940 | ○ | 22.8 | 1.9 | Inventive Example |
| O | nitrogen | −5 | 900 | 6 | 0.45 | 2158 | 970 | ○ | 23.6 | 1.8 | Inventive Example |
| P | air | 26 | 900 | 6 | 0.67 | <u>618</u> | 410 | ○ | 24.7 | 3.1 | Comparative Example |
| Q | air | 26 | 900 | 6 | 0.66 | 1027 | 680 | ○ | 22.6 | <u>0.2</u> | Comparative Example |

[1] TS × H: product of maximum strength (MPa) and hydrogen content (ppmw) in base steel sheet
[2] Before the maximum strength in a tensile strength curve, fracture occurred: X, did not occur: ○
[3] Oxygen wt % at a depth of 0.1 μm from a surface by GDS analysis
[4] ISO 18278-2

Next, a hot forming process was performed on batch-annealed samples under heat treatment conditions shown in Table 11 above. Other air cooling and rapid cooling processes were performed in the same manner as in Example 1. Thereafter, a tension test, content evaluation, and spot welding current range evaluation were performed on the samples in the same manner as in Example 1. Inventive Examples A to O had proper tensile characteristics and spot welding current ranges. However, Comparative Example P had difficulty in guaranteeing a desired degree of strength, and Comparative Example Q had difficulty in guaranteeing a proper spot welding current range because of high carbon, manganese, and aluminum contents in steel.

While exemplary embodiments of the present disclosure have been shown and described, it will be apparent to those skilled in the art that modifications and variations could be made without departing from the scope of the present invention. Therefore, the scope of the present invention is not limited to the embodiments but should be defined by the appended claims and equivalents thereof.

The invention claimed is:
1. An aluminum-iron (Al—Fe) alloy coated steel sheet for hot forming, having high resistance to hydrogen delayed fracture and coating layer separation and high weldability, the Al—Fe alloy coated steel sheet comprising a base steel sheet and an alloy coating layer formed between the base steel sheet and an oxide layer, wherein the base steel sheet comprises, by wt %, carbon (C): 0.1% to 0.5%, silicon (Si): 0.01% to 2%, manganese (Mn): 0.01% to 10%, phosphorus (P): 0.001% to 0.05%, sulfur (S): 0.0001% to 0.02%, aluminum (Al): 0.001% to 1.0%, nitrogen (N): 0.001% to 0.02%, and a balance of iron (Fe) and other impurities,
wherein the alloy coating layer comprises:
an Al—Fe alloy layer I formed on the base steel sheet and having a Vickers hardness of 200 Hv to 800 Hv;
an Al—Fe alloy layer III formed on the Al—Fe alloy layer I and having a Vickers hardness of 700 Hv to 1200 Hv; and
an Al—Fe alloy layer II formed in the Al—Fe alloy layer III continuously or discontinuously in a length direction of the steel sheet, and having a Vickers hardness of 400 Hv to 900 Hv,
wherein an average oxygen content at a depth of 0.1 μm from a surface of the oxide layer is 20% or less by weight.
2. The Al—Fe alloy coated steel sheet of claim 1, wherein the Al—Fe alloy layer I has an Al content within a range of 5% to 30% by weight, the Al—Fe alloy layer II has an Al content within a range of 20% to 50% by weight, and the Al—Fe alloy layer III has an Al content within a range of 40% to 70% by weight.

3. The Al—Fe alloy coated steel sheet of claim 1, wherein a cross-sectional area fraction of an Al—Fe intermetallic compound phase having an Al content of 70% or less by weight is greater than 99% in the alloy coating layer.

4. The Al—Fe alloy coated steel sheet of claim 1, wherein the base steel sheet has a hydrogen content of 0.5 ppmw or less.

5. The Al—Fe alloy coated steel sheet of claim 1, wherein the base steel sheet further comprises at least one selected from the group consisting of chromium (Cr), molybdenum (Mo), and tungsten (W) in an amount of 0.01% to 4.0%.

6. The Al—Fe alloy coated steel sheet of claim 1, wherein the base steel sheet further comprises at least one selected from the group consisting of titanium (Ti), niobium (Nb), zirconium (Zr), and vanadium (V) in an amount of 0.001% to 0.4%.

7. The Al—Fe alloy coated steel sheet of claim 1, wherein the base steel sheet further comprises copper (Cu)+nickel (Ni) in an amount of 0.005% to 2.0%.

8. The Al—Fe alloy coated steel sheet of claim 1, wherein the base steel sheet further comprises antimony (Sb)+tin (Sn) in an amount of 0.001% to 1.0%.

9. The Al—Fe alloy coated steel sheet of claim 1, wherein the base steel sheet further comprises boron (B) in an amount of 0.0001% to 0.01%.

10. A hot press formed (HPF) member having high resistance to hydrogen delayed fracture and coating layer separation and high weldability, the HPF member being formed by performing a hot press forming process on the Al—Fe alloy coated steel sheet of any one of claims 1 to 9, the HPF member comprising martensite as a main phase of a microstructure thereof and having a tensile strength of 1000 MPa or greater.

11. The HPF member of claim 10, wherein the product of the tensile strength of the HPF member and the hydrogen content of the base steel sheet is 1300 or less.

12. The HPF member of claim 10, wherein surface oxides of the HPF member have an average oxygen weight percent within a range of 40% or less at a depth of 0.1 μm from a surface of the surface oxides.

13. A method of manufacturing an Al—Fe alloy coated steel sheet for hot forming, the Al—Fe alloy coated steel sheet having high resistance to hydrogen delayed fracture and coating layer separation and high weldability, the method comprising:
    forming an Al—Si coating layer on a surface of a base steel sheet, the base steel sheet comprising, by wt %, carbon (C): 0.1% to 0.5%, silicon (Si): 0.01% to 2%, manganese (Mn): 0.01% to 10%, phosphorus (P): 0.001% to 0.05%, sulfur (S): 0.0001% to 0.02%, aluminum (Al): 0.001% to 1.0%, nitrogen (N): 0.001% to 0.02%, and a balance of iron (Fe) and other impurities;
    heating the Al—Si coated base steel sheet to a heat treatment maximum temperature ranging from 450° C. to 750° C. at a heating rate of 1° C./hr to 500° C./hr in a heating furnace in which an atmosphere having a dew point of less than −10° C. is present; and
    forming an Al—Fe alloy coating layer on the surface of the base steel sheet by maintaining the Al—Si coated base steel sheet at the heat treatment maximum temperature for 1 to 100 hours.

14. The method of claim 13, wherein before reaching the heat treatment maximum temperature, the Al—Si coated base steel sheet is maintained within a temperature within a range of 300° C. to less than a melting point of an Al coating layer for 1 to 100 hours.

15. The method of claim 13, wherein the Al—Fe alloy coating layer comprises:
    an Al—Fe alloy layer I formed on the base steel sheet and having a Vickers hardness of 200 Hv to 800 Hv;
    an Al—Fe alloy layer III formed on the Al—Fe alloy layer I and having a Vickers hardness of 700 Hv to 1200 Hv; and
    an Al—Fe alloy layer II formed in the Al—Fe alloy layer III continuously or discontinuously in a length direction of the steel sheet, and having a Vickers hardness of 400 Hv to 900 Hv,
    wherein an oxide layer is formed on an upper portion of the Al—Fe alloy coating layer, and an average oxygen content at a depth of 0.1 μm from a surface of the oxide layer is 20% or less by weight.

16. The method of claim 15, wherein the Al—Fe alloy layer I has an Al content within a range of 5% to 30% by weight, the Al—Fe alloy layer II has an Al content within a range of 20% to 50% by weight, and the Al—Fe alloy layer III has an Al content within a range of 40% to 70% by weight.

17. The method of claim 13, wherein the base steel sheet has a hydrogen content of 0.5 ppmw or less.

18. A method of manufacturing an HPF member having high resistance to hydrogen delayed fracture and coating layer separation and high weldability, the method comprising:
    preparing a coated steel sheet by the method of any one of claims 13 to 17;
    heating the coated steel sheet at a heating rate of 1° C./s to 1000° C./s to a temperature within a range of Ae3+30° C. to Ae3+150° C., and then maintaining the coated steel sheet at the temperature for 1 second to 1000 seconds; and
    hot forming the heated coated steel sheet and simultaneously cooling the steel sheet at a cooling rate of 1° C./s to 1000° C./s.

* * * * *